Nov. 30, 1943.  R. M. HEINTZ  2,335,276

DIAPHRAGM

Filed May 11, 1942

INVENTOR.
RALPH M. HEINTZ.
BY
Frank H. Harmon
ATTORNEY.

Patented Nov. 30, 1943

2,335,276

UNITED STATES PATENT OFFICE 2,335,276

DIAPHRAGM

Ralph M. Heintz, Cleveland, Ohio, assignor to Jack & Heintz, Inc., Bedford, Ohio, a corporation of Ohio Application May 11, 1942, Serial No. 442,525

7 Claims. (Cl. 137—157)

This invention relates in general to diaphragms and more particularly to those having protective elements therefor.

One of the primary objects of the invention is to provide a unitary protective element that may be stamped out to include a protective rim secured to the diaphragm body with connecting side portions to protect the diaphragm but frangibly connected to the rim portion and removable after installation of the diaphragm in any device for its intended purpose.

With the foregoing and other objects in view the invention resides in the combination of parts and in the details of construction hereinafter set forth in the following specification and appended claims, certain embodiments thereof being illustrated in the accompanying drawing, in which:

Figure 1:
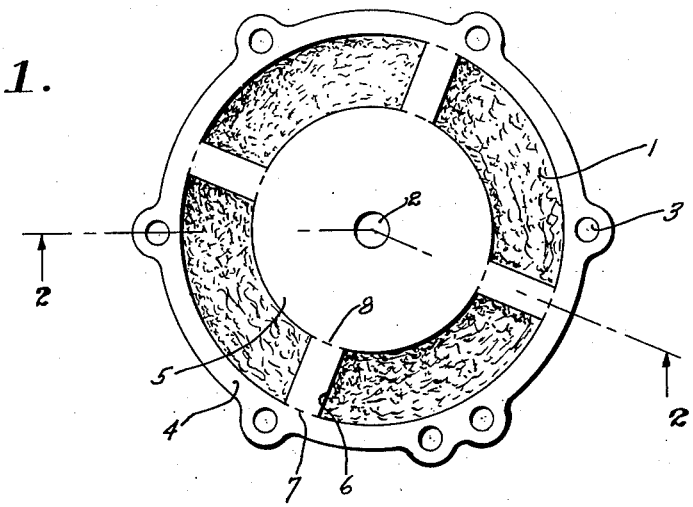
Figure 1 is a view in plan of the diaphragm before installation, showing the complete protective member with the protective rim and center portion secured to one side of the diaphragm body and the radiating protective spokes unattached to the diaphragm body and frangibly secured to the protective rim and center portion.

Referring more particularly to the drawing, the main diaphragm body 1 may be of any suitable thin yieldable sheet of such material as leather, rubber, fibre or metal and may be provided with a central aperture 2 and a series of apertures 3 near its periphery for installation purposes.

The unitary protective element may be cut or stamped to have its periphery substantially conform with that of the diaphragm. As shown in the drawing it may comprise a rim 4 and a central portion 5 with four radiating spokes 6 extending between and forming a unitary part of the rim and center portions. Each of the spokes 6 is provided with perforations 7 adjacent the rim and perforations 8 adjacent the center portion.

Figure 2:
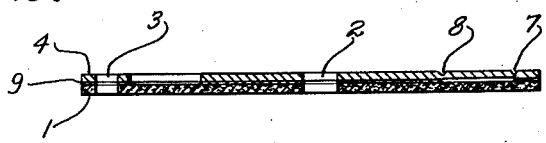
Figure 2 is a view in section taken along line 2—2 of Figure 1.
Figure 3:
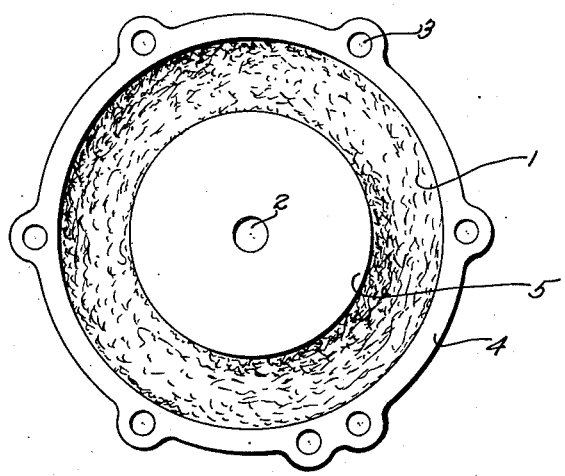
Figure 3 is a view similar to Figure 1 with the stiffening spokes removed.

In assembling this construction the protective unit may be superimposed upon the diaphragm so that its periphery and its center and rim apertures are in alignment with those of the diaphragm. The rim and center portions are then suitably affixed, secured, bonded or cemented to the diaphragm, as indicated at 9, leaving the spokes in contact with but not secured to the diaphragm. Whether such a protective unit is secured to one side, as shown in Figure 2, or both sides of the diaphragm it will serve to protect the diaphragm body in handling and in the operation of installation of the same in any device where it may accomplish its intended purpose. After such installation of the assembly shown in Figure 1, each spoke, not being directly secured to the diaphragm body, may be easily and readily removed by tearing the same along the perforations 7 and 8. Thus, as shown in Figure 3, the rim 4 and center portion 5 protect the outer and center portions of the diaphragm at its points in installation, leaving the main body of the diaphragm free for appropriate flexing and yielding.

As stated before, the particular illustration in the drawing shows the protective unit applied only to one side of the diaphragm, but it will be well understood that it may be applied to both sides of the diaphragm if found desirable. Also, the drawings show the diaphragm to have a center aperture with a center protective portion secured to the diaphragm. This particular illustration and description is made merely for representing one form the present invention may take when used in an installation in an air relay in an automatic pilot where the diaphragm center aperture receives a rod for operating a balanced oil valve of a hydraulic servo motor system. It is to be understood that where in other uses for the diaphragm, there is no occasion for a center aperture, the spokes, unattached to the diaphragm, may extend diametrically across the diaphragm, or an unapertured center portion, as well as the spokes, may be unattached to the diaphragm body.

From the foregoing, it will be seen that there has been provided a readily assembled diaphragm assembly including a protective unit serving as a whole to protect the diaphragm in handling and installation and having portions readily removable after installation so that the diaphragm may properly function in its intended manner.

I claim.

1. In combination with a diaphragm, a protective unit therefor having its outer portion secured to said diaphragm and side portions extending over and unattached to the main body portion of said diaphragm and being structurally weakened at its points of attachment to said outer portion so as to be frangible and releasable therefrom.

2. In combination with a diaphragm, a protective unit therefor having its outer portion secured to said diaphragm and side portions extending over and unattached to the main body portion of said diaphragm, the points of attachment of said side portions with said outer portion being perforated so as to be frangibly secured thereto and releasable therefrom.

3. In combination with a diaphragm, a protective unit therefor having its outer portion secured to said diaphragm and side portions extending over and unattached to the main body portion of said diaphragm, the points of attachment of said side portions with said outer portion being perforated so as to be frangibly secured thereto and releasable therefrom whereby said protective unit as a whole is adapted to protect said diaphragm before and during installation and said outer portion is adapted to protect said diaphragm at its points of connection to the assembly in which it is installed after removal of said side portions to release said diaphragm from confinement and adapt it to operate as such.

4. In combination with a diaphragm with apertures at its center and near its outer rim, a protective unit therefor having substantially the same contour and corresponding apertures and having an outer rim portion and center portion bonded to said diaphragm and radiating spokes extending between said portions, said spokes being free from attachment to said diaphragm and structurally weakened at their points of attachment to said center and rim portions so as to be frangible and releasable therefrom.

5. In combination with a diaphragm, a protective unit therefor having substantially the same contour and having an outer rim portion and center portion bonded to said diaphragm and radiating spokes extending between said portions, said spokes being free from attachment to said diaphragm and structurally weakened at their points of attachment to said rim and center portions so as to be frangible and releasable therefrom.

6. In combination with a diaphragm with apertures at its center and near its outer rim, a protective unit therefor having substantially the same contour and corresponding apertures and having an outer rim portion and center portion bonded to said diaphragm and radiating spokes extending between said portions, said spokes being free from attachment to said diaphragm and being perforated at their points of attachment to said rim and center portions so as to be releasable therefrom.

7. In combination with a diaphragm with apertures at its center and near its outer rim, a protective unit therefor having substantially the same contour and corresponding apertures and having an outer rim portion and center portion bonded to said diaphragm and radiating spokes extending between said portions, said spokes being free from attachment to said diaphragm and being perforated at their points of attachment to said rim and center portions so as to be releasable therefrom whereby said protective unit as a whole is adapted to protect said diaphragm before and during installation and said outer portion is adapted to protect said diaphragm at its points of connection to the assembly in which it is installed after removal of said side portions to release said diaphragm from confinement and adapt it to operate as such.

RALPH M. HEINTZ.